(12) United States Patent
Stanifer et al.

(10) Patent No.: US 8,985,564 B2
(45) Date of Patent: Mar. 24, 2015

(54) WORKPIECE HOLDING FIXTURE FOR MACHINING MULTIPLE PRISMATIC PARTS

(75) Inventors: Richard S. Stanifer, Springboro, OH (US); Michael Joseph Habel, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 307 days.

(21) Appl. No.: 13/524,064

(22) Filed: Jun. 15, 2012

(65) Prior Publication Data

US 2013/0334753 A1 Dec. 19, 2013

(51) Int. Cl.
*B23Q 11/00* (2006.01)
*B23Q 3/06* (2006.01)

(52) U.S. Cl.
CPC ........... *B23Q 3/069* (2013.01); *Y10T 29/49998* (2013.01)
USPC ................ 269/32; 269/45; 269/281; 269/311

(58) Field of Classification Search
USPC .................... 269/32, 45, 281.5, 311
See application file for complete search history.

(56) References Cited

U.S. PATENT DOCUMENTS

| | | | |
|---|---|---|---|
| 3,174,746 A | | 3/1965 | Bean |
| 3,436,071 A | | 4/1969 | Petruccelli |
| 4,821,408 A | | 4/1989 | Speller, Sr. et al. |
| 5,352,249 A | * | 10/1994 | Vollaro ......................... 29/25.01 |
| 5,732,455 A | * | 3/1998 | Diede ........................... 29/281.5 |
| 5,771,553 A | | 6/1998 | Sim et al. |
| 6,644,637 B1 | | 11/2003 | Agapiou et al. |
| 7,422,202 B2 | * | 9/2008 | Wu ............................... 269/303 |
| 8,025,277 B2 | * | 9/2011 | Lin et al. ......................... 269/55 |
| 2003/0034602 A1 | | 2/2003 | Kavanaugh |
| 2010/0140860 A1 | * | 6/2010 | Gao et al. ...................... 269/311 |

FOREIGN PATENT DOCUMENTS

CN 201596907 U 10/2010

OTHER PUBLICATIONS

M.N. Sela et al., "A Reconfigurable Modular Fixturing System for Thin-Walled Flexible Objects," Department of Mechanical and Industrial Engineering, University of Toronto, Oct. 1996, 19 pages.
S. Arzanpour et al., "Flexible Fixture Design with Applications to Assembly of Sheet Metal Automotive Body Parts," Assembly Automation, vol. 26, No. 2, Published Apr. 1, 2006, 1 page.

* cited by examiner

*Primary Examiner* — Lee D Wilson
*Assistant Examiner* — Shantese McDonald
(74) *Attorney, Agent, or Firm* — Damian Porcari; Price Heneveld LLP

(57) ABSTRACT

A workpiece holding fixture including a base plate having an engagement surface including a travel slot. A first static riser includes a position control member configured to removably couple a workpiece to the first static riser. A second static riser includes a rotation control member and is configured to removably couple the workpiece to the second static riser. A dynamic riser is configured to abut the workpiece by automatic, semi-automatic, or manual movement into secure engagement with the workpiece. The dynamic riser is slidably coupled with the travel slot and is operable between a plurality of positions associated with workpiece variants having different locating features and geometries.

20 Claims, 13 Drawing Sheets

WORKPIECE HOLDING FIXTURE FOR MACHINING MULTIPLE PRISMATIC PARTS

FIELD OF THE INVENTION

The present invention generally relates to a fixture that is designed for use with multiple prismatic parts, and more specifically, to a fixture that includes at least one movable riser/locating pad/clamp assembly for rapid transitioning between different parts or workpiece types, eliminating the requirement of exchanging the fixture or fixture components.

BACKGROUND OF THE INVENTION

Fixtures are used in manufacturing practices to process workpieces. The fixtures must be stable and robust and be able to securely hold a workpiece in place as the workpiece is processed.

SUMMARY OF THE INVENTION

According to one aspect of the present invention, a workpiece holding fixture including a base plate having an engagement surface including a travel slot. A first static riser includes a position control member configured to removably couple a workpiece to the first static riser. A second static riser includes a rotation control member and is configured to removably couple the workpiece to the second static riser. A dynamic riser is configured to abut the workpiece. The dynamic riser is slidably coupled with the travel slot and is operable between a plurality of positions associated with workpiece variants having different locating features and geometries.

According to another aspect of the present invention, a workpiece holding fixture includes a base plate. First and second static risers are engaged with the base plate and are configured to securely engage a workpiece at predetermined locating positions. A dynamic riser is configured to movably engage the workpiece.

According to yet another aspect of the present invention, a method of holding a workpiece for processing includes providing a base plate and securely engaging first and second static risers to the base plate. A dynamic riser is adjusted into secure engagement with an unprocessed initial workpiece. The first and second static risers are engaged with the unprocessed initial workpiece at predetermined locating positions. The unprocessed initial workpiece is processed.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
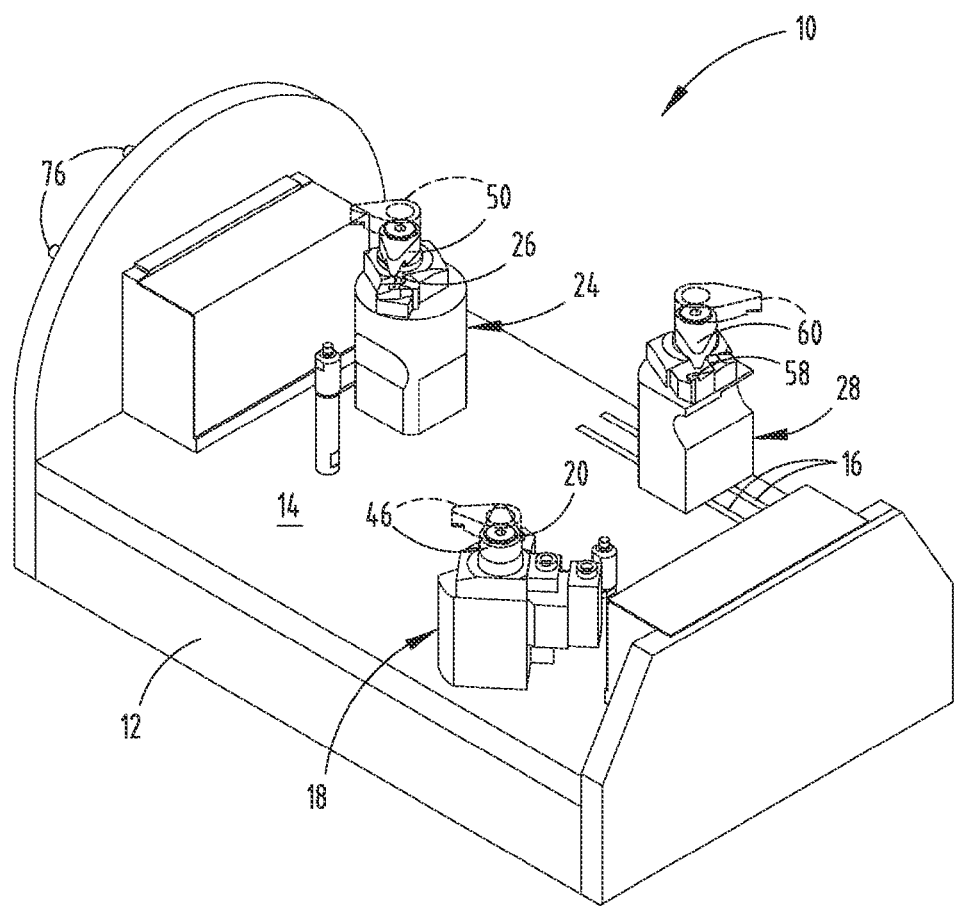
FIG. 1 is a top perspective view of one embodiment of a workpiece holding fixture of the present invention.
Figure 1A:
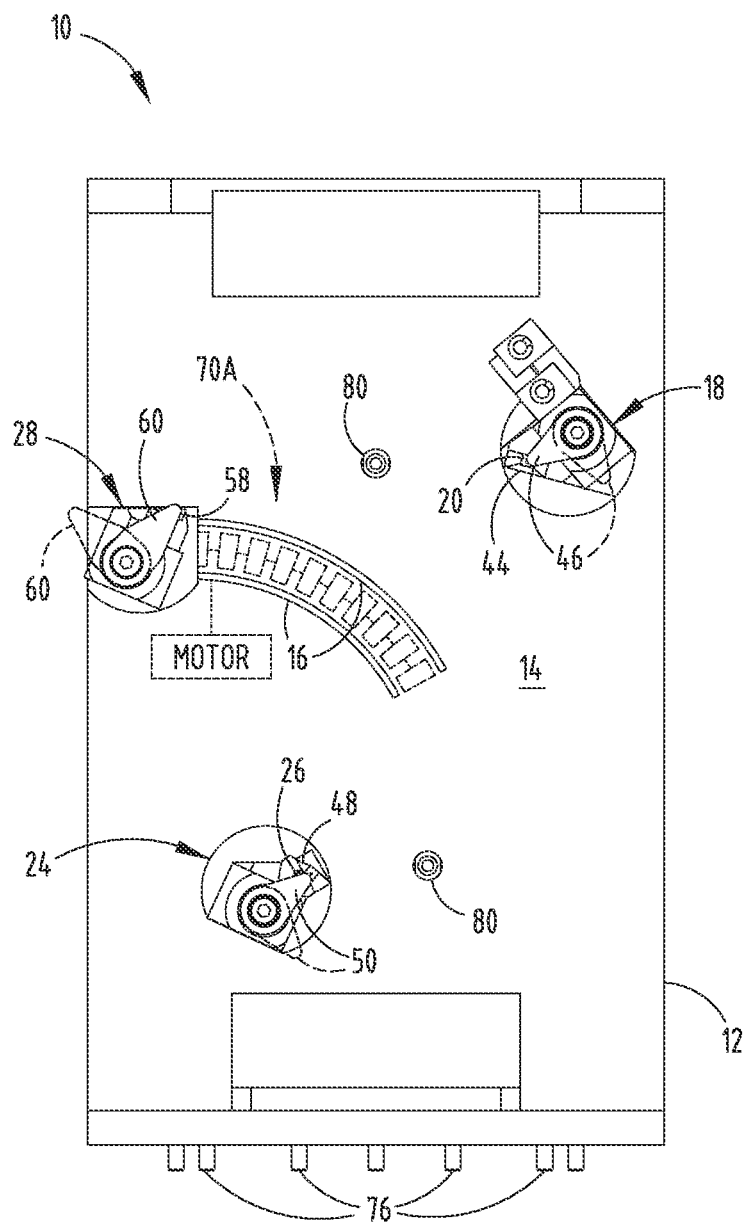
FIG. 1A is a top plan view of one embodiment of a workpiece holding fixture having a transition device for moving a riser.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-11, reference numeral 10 generally designates a workpiece holding fixture that includes a base plate 12 having an engagement surface 14 with a travel slot 16. A first static riser 18 includes a positional control member, such as a cylindrical engagement pin 20, configured to removably couple a workpiece 22 (FIGS. 9-11) to the first static riser 18. A second static riser 24 includes a rotation control member, such as an engagement pin 26, with a diamond-shaped cross-section and configured to removably couple the workpiece 22 to the second static riser 24. A dynamic riser 28 is slidably coupled with the travel slot 16 and is operable between a plurality of positions associated with various workpieces 22.

Referring again to FIG. 1, the first and second static risers 18, 24 of the workpiece holding fixture 10 are fixedly connected to the engagement surface 14 of the base plate 12. The first and second static risers 18, 24 are designed to be removed only after mechanical fasteners or other mechanical features that secure the first and second risers 18, 24 to the base plate 12 are removed. Generally, if the first and second static risers 18, 24 need to be relocated for engagement with a different workpiece 22, the entire base plate 12 is removed. Each of the first and second static risers 18, 24 includes a retention member configured to minimize or eliminate movement of the workpiece 22 (FIG. 9) relative to the first and second static risers 18, 24, thus providing a workpiece 22 that is securely engaged and will not shift, vibrate, or wobble during processing. The workpiece 22 includes locating features, such as first, second, and third tabs, that are configured for secure engagement with the first, second, and third tabs, respectively.

As noted above, the engagement pin 20 of the first static riser 18 includes a cylindrical construction, which is configured for engagement with a support pad 44 of the first static riser 18. The cylindrical engagement pin 20 is configured to engage a first tab disposed on the workpiece 22. The first tab includes an aperture adapted to closely receive the cylindrical engagement pin 20 with a very tight tolerance—in the magnitude of ±13 microns. The first tab may be formed as a portion of the workpiece 22, or may be a removable part that is used only during the processing of the workpiece 22. The first tab may be constructed from a variety of materials, such as aluminum or steel.

The second static riser 24 includes the engagement pin 26 and a support pad 48. The engagement pin 26 has a diamond-shaped cross-section. The second tab of the workpiece 22 includes an aperture for receiving the engagement pin 26 with the diamond-shaped cross-section. The dynamic riser 28 does not include a pin at all but does include a support pad 58.

During installation of a workpiece 22 onto the workpiece holding fixture 10, the aperture of the first tab of the workpiece 22 engages the engagement pin 20 of the first static riser 18. Simultaneously, the aperture of the second tab of the workpiece 22 engages the engagement pin 26 of the second static riser 24. The workpiece 22 is smoothly transitioned into position onto the workpiece holding fixture 10, such that the first, second, and third tabs engage the first, second, and third support pads 44, 48, 58, simultaneously, or in rapid succession.

Accordingly, the workpiece 22 is held in place in both the x and y directions (via the cylindrical engagement pin 20 of the first static riser 18), as well as rotationally (via the engagement pin 26 with the diamond-shaped cross-section). Stated differently, the cylindrical engagement pin 20 holds the workpiece 22 in place laterally along a plane parallel with the engagement surface 14 of the base plate 12. At the same time, the engagement pin 26 limits rotation of the workpiece 22. Once the support pads 44, 48 of the first and second static risers 18, 24 are in abutment with the workpiece 22, securing clamps 46, 50 on the second static riser 24 clamp down into secure engagement with the first and second tabs, respectively. At the same time, a securing clamp 60 on the dynamic riser 28 locks down the workpiece 22 to the support tab 58. The workpiece 22 is now in secure engagement with each of the first and second static risers 18, 24, as well as the dynamic riser 28. The workpiece holding fixture 10 now has secure control of the workpiece 22 so that the workpiece 22 can be further processed, machined, or finished. Once the workpiece 22 has been processed, machined, or finished, the securing clamps 46, 50, 60 can be unclamped to allow removal of the workpiece 22 from the workpiece holding fixture 10. In the illustrated embodiment, the securing clamps 46, 50, 60 are vertically extendable and rotatable. However, it is also contemplated that other securing devices can be used to hold the workpiece 22.

After the initial workpiece 22 has been removed from the workpiece holding fixture 10, the dynamic riser 28 can then be moved automatically, semi-automatically, or manually, into position for engagement with a new workpiece 22 to be processed. The dynamic riser 28 is moved until the third tab of the new workpiece 22 is aligned to abut the support pad 58 of the dynamic riser 28. The securing clamp 60 on the dynamic riser 28 locks down the new workpiece 22 to the support pad 58. The new workpiece 22 is now in secure engagement with each of the first and second static risers 18, 24, as well as the dynamic riser 28. The workpiece holding fixture 10 now has secure control of the new workpiece 22 so that the workpiece 22 can be further processed, machined, or finished.

It is generally contemplated that the workpiece holding fixture 10 can move the dynamic riser 28 by utilizing an automatic system, a semi-automatic system, or a manual system, as generally outlined herein. In one embodiment, the dynamic riser 28 of the workpiece holding fixture 10 moves automatically based upon user-supplied input that directs the dynamic riser 28 to move into position to engage a particular workpiece 22. Accordingly, the automatic system requires no user interface and operates by preset data prior to operation of the workpiece holding fixture 10. In another embodiment, the dynamic riser 28 is semi-automatically adjusted on the workpiece holding fixture 10. More specifically, a user provides instructions via a computer to the dynamic riser 28 to move to a predetermined location for engagement with a particular workpiece 22. In this instance, a user would likely determine which new workpiece 22 is going to be processed and enters instructions into a computerized system to move the dynamic riser 28 to the proper location. Yet another embodiment includes manual movement of the dynamic riser 28 on the workpiece holding fixture 10. In this instance, the dynamic riser 28 is moved by hand by a user to a position correlating with a particular workpiece 22 size and construction. For each of the aforementioned systems, it is generally contemplated that the dynamic 28 will be moved into position prior to placement of the workpiece 22 into secure engagement with each of the first and second static risers 18, 24, as well as the dynamic riser 28. However, it is also contemplated that the workpiece 22 may be placed in position against the first and second static risers 18, 24 prior to movement of the dynamic riser 28 into abutting engagement with the workpiece 22.

Figure 1B:
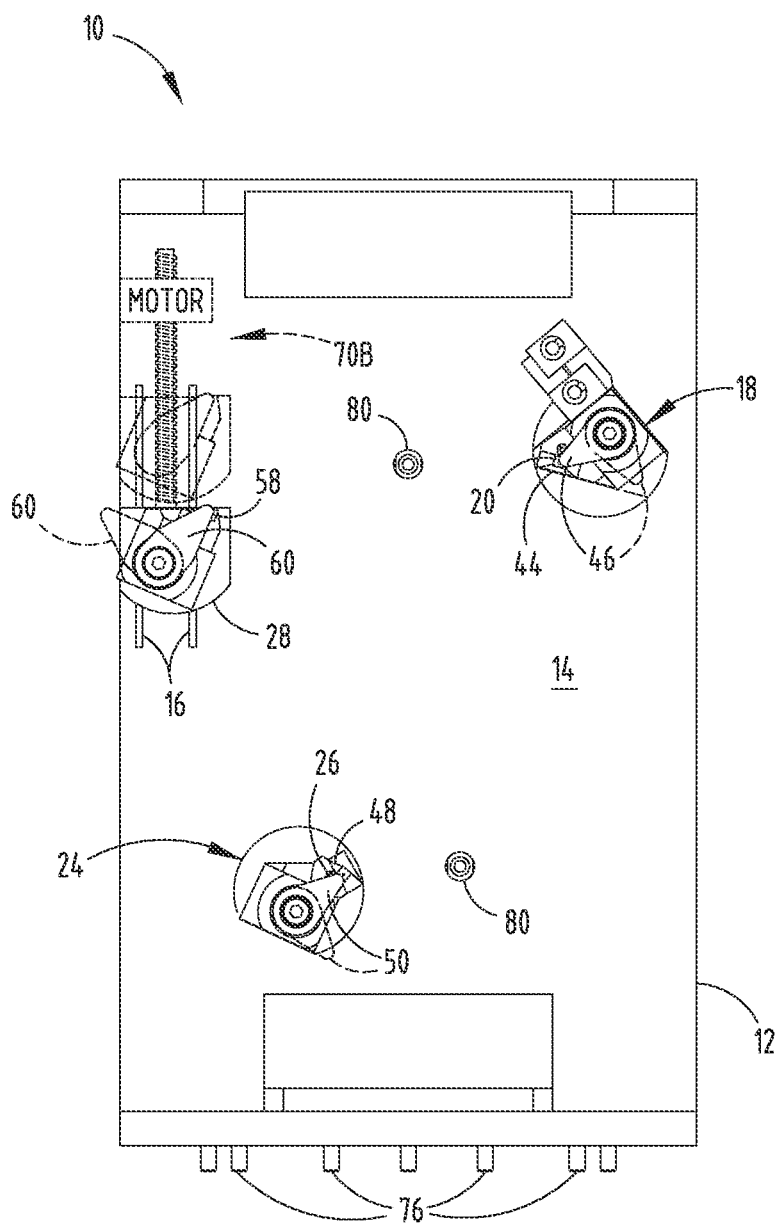
FIG. 1B is a top plan view of another embodiment of a workpiece holding fixture having a transition device for moving a riser.
Figure 1C:
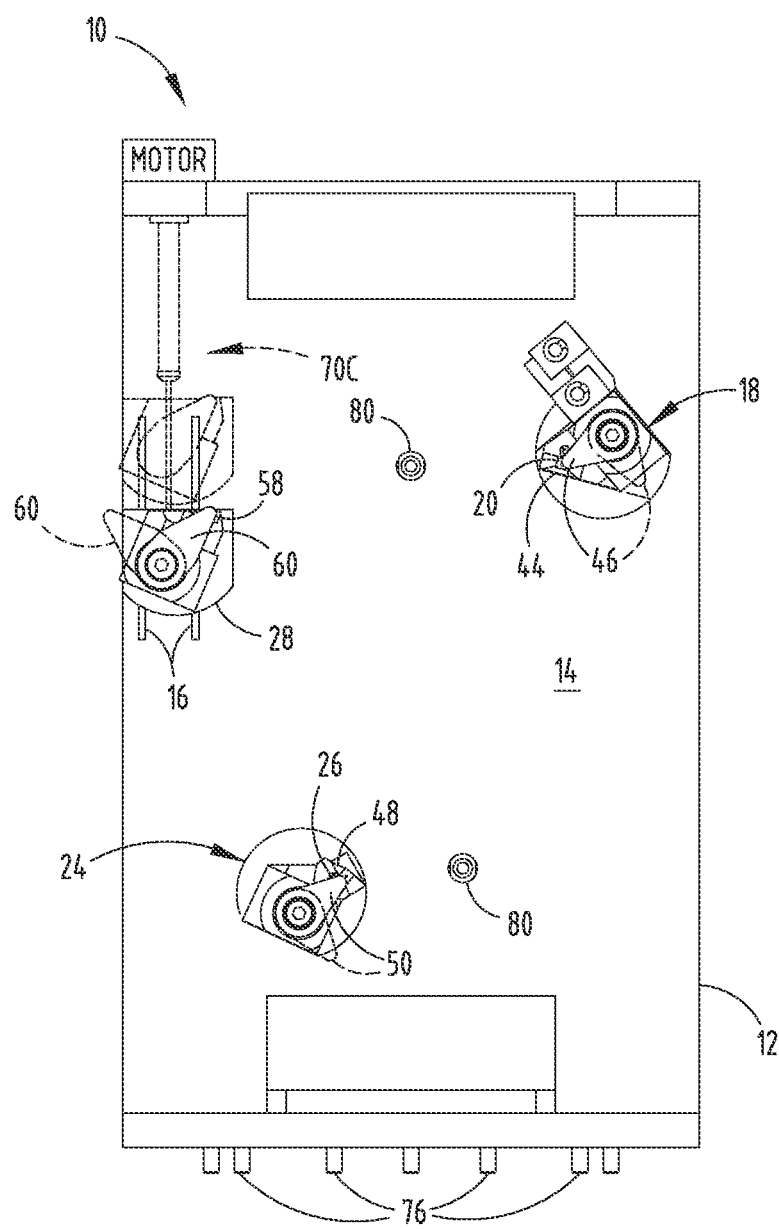
FIG. 1C is a top plan view of another embodiment of a workpiece holding fixture having a transition device for moving a riser.
Figure 1D:
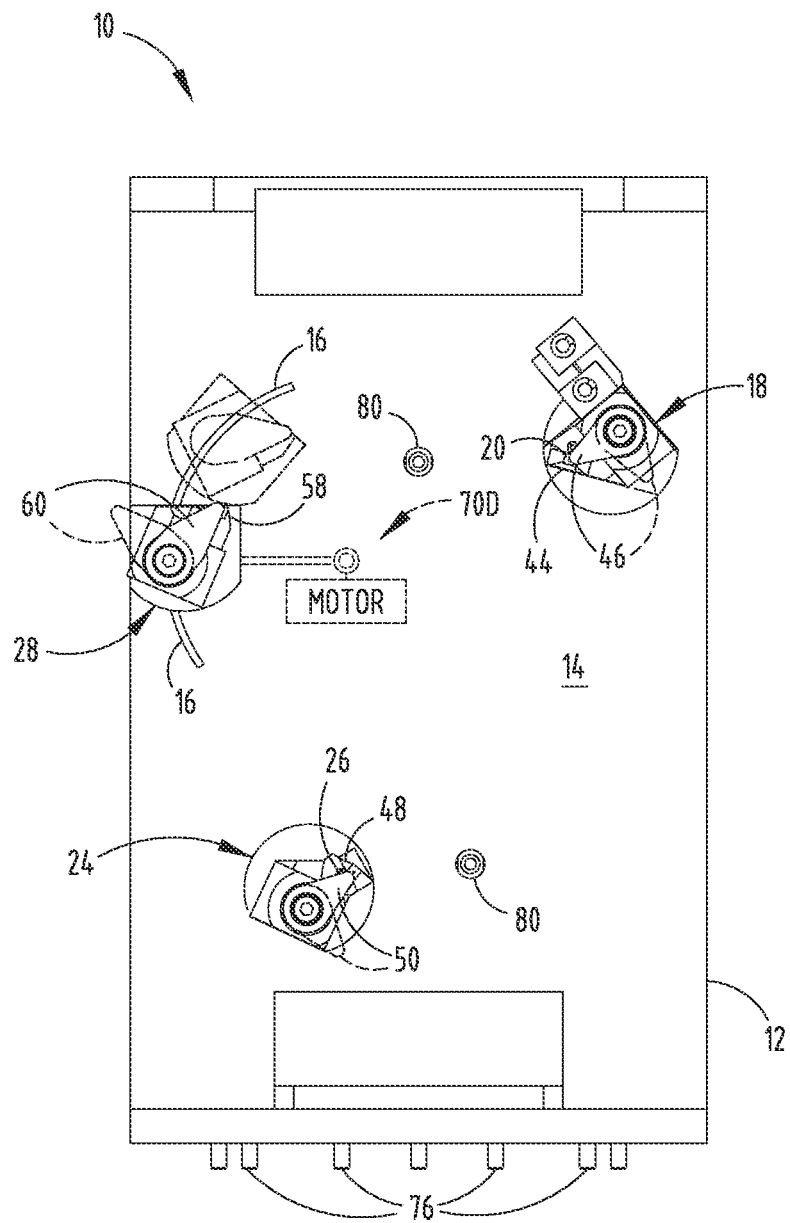
FIG. 1D is a top plan view of still another embodiment of a workpiece holding fixture having a transition device for moving a riser.
Figure 1E:
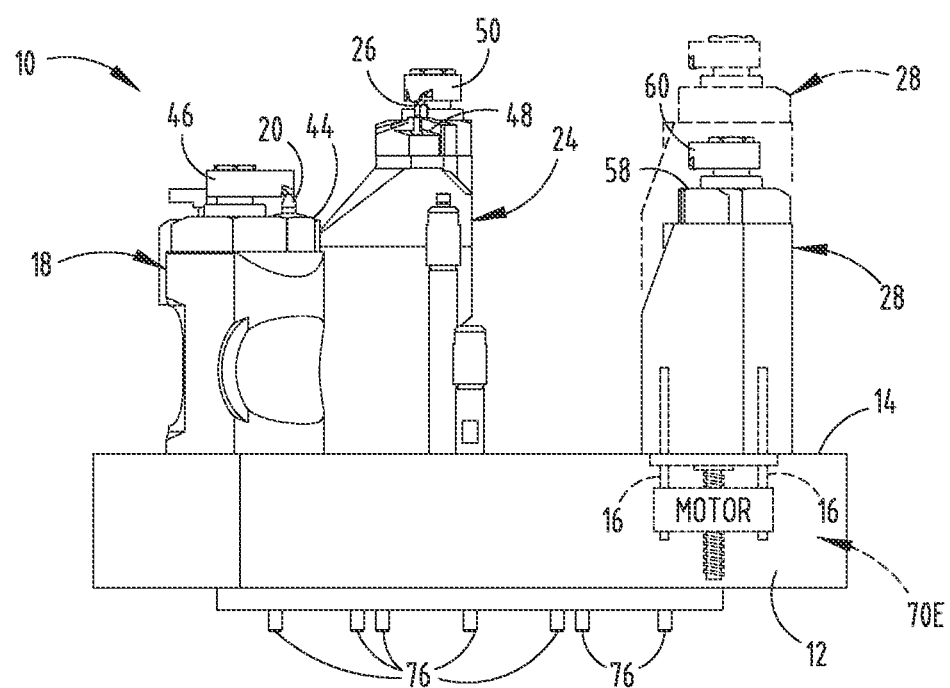
FIG. 1E is a side elevational view of yet another embodiment of a workpiece holding fixture having a transition device for moving a riser.
Figure 2:
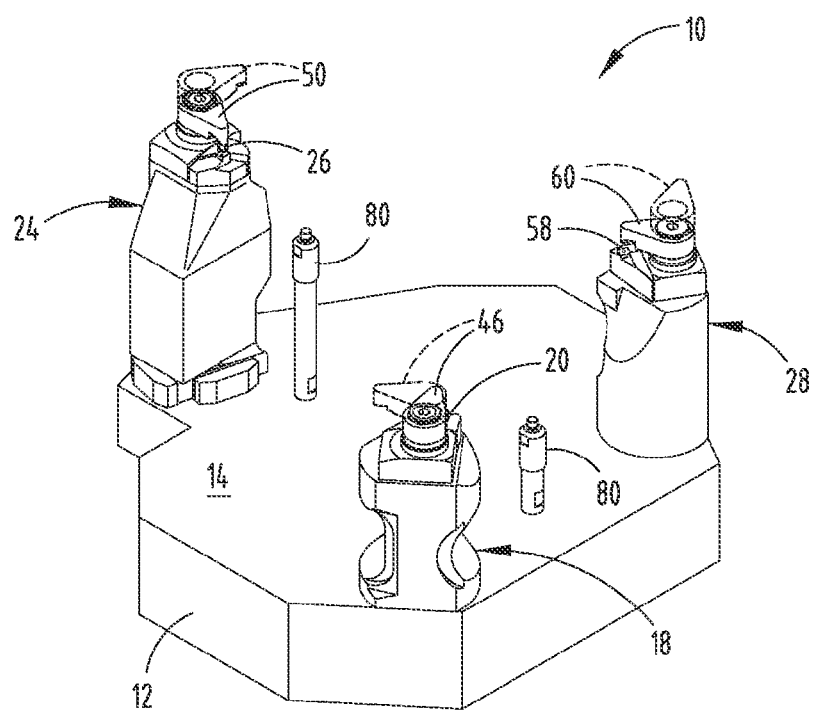
FIG. 2 is a top perspective view of another embodiment of a workpiece holding fixture of the present invention.
Figure 2A:
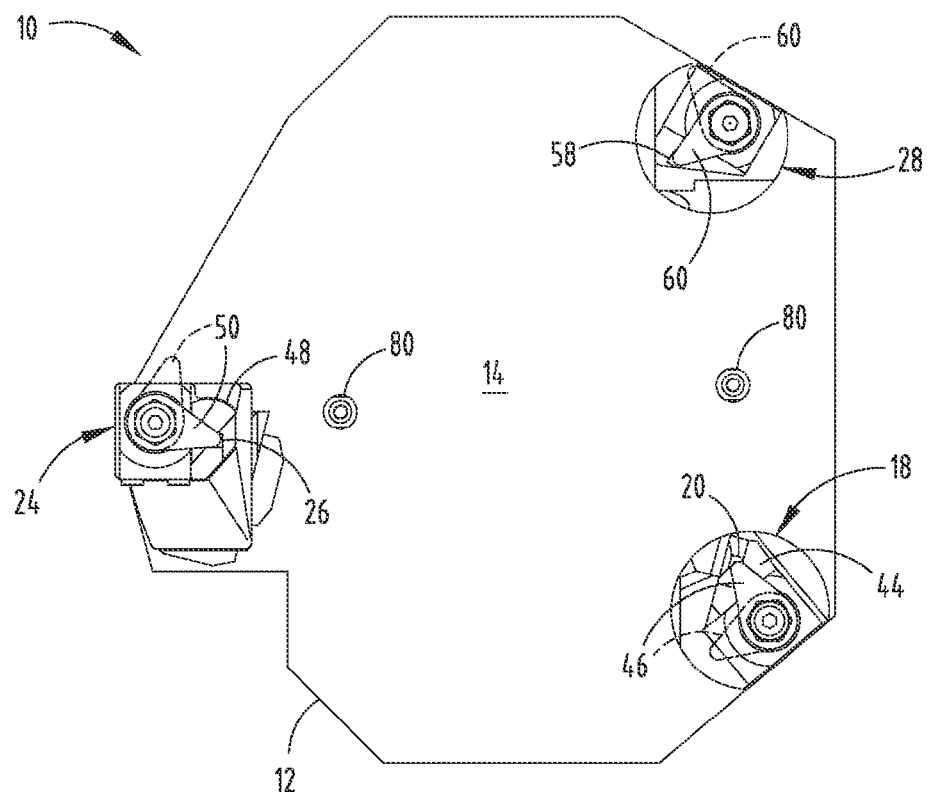
FIG. 2A is a top plan view of the workpiece holding fixture of FIG. 2.
Figure 3:
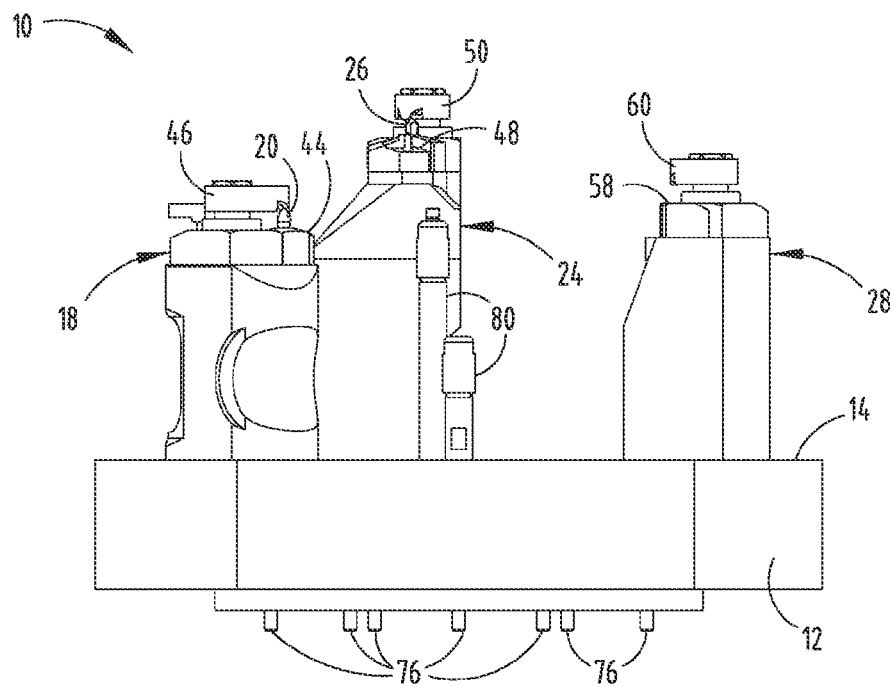
FIG. 3 is a first side elevational view of the fixture of FIG. 2.

It is contemplated that the dynamic riser 28 can be configured to move on the base plate 12 in a variety of manners. For example, as generally illustrated in FIGS. 1A-1D, the dynamic riser 28 may be connected with a linear motor 70A, an electromechanical system, such as a mechanical screw or a worm gear 70B, a hydraulic or pneumatic system, such as a hydraulic (or pneumatic) cylinder 70C, a rotating motor 70D, a servo motor, or other transition device adapted to move the dynamic riser 28 into position to secure the subject workpiece 22 for further processing. For purposes of this disclosure, hydraulic systems include those systems that utilize pressurized liquid, and pneumatic systems are those systems that include pressurized gases. The size of the base plate 12 allows for movement of the dynamic riser 28 to cross a distance of up to 5 inches or more. Accordingly, once the workpiece 22 has been secured with the first and second static risers 18, 24, only the dynamic riser 28 needs to be secured to the workpiece 22. Additionally, it is contemplated that the dynamic riser 28 may move about a linear path (FIGS. 1B and 1C) into secure engagement with the workpiece 22, or may take an arcuate or radial path (FIGS. 1A and 1D) into engagement with the workpiece 22 prior to processing. In one embodiment, the transition device, which moves the dynamic riser 28, is disposed inside the base plate 12. However, it is also contemplated that the dynamic riser 28 could withdraw into and out of the base plate 12 on an elevatable stanchion 70E (FIG. 1E).

Figure 4:
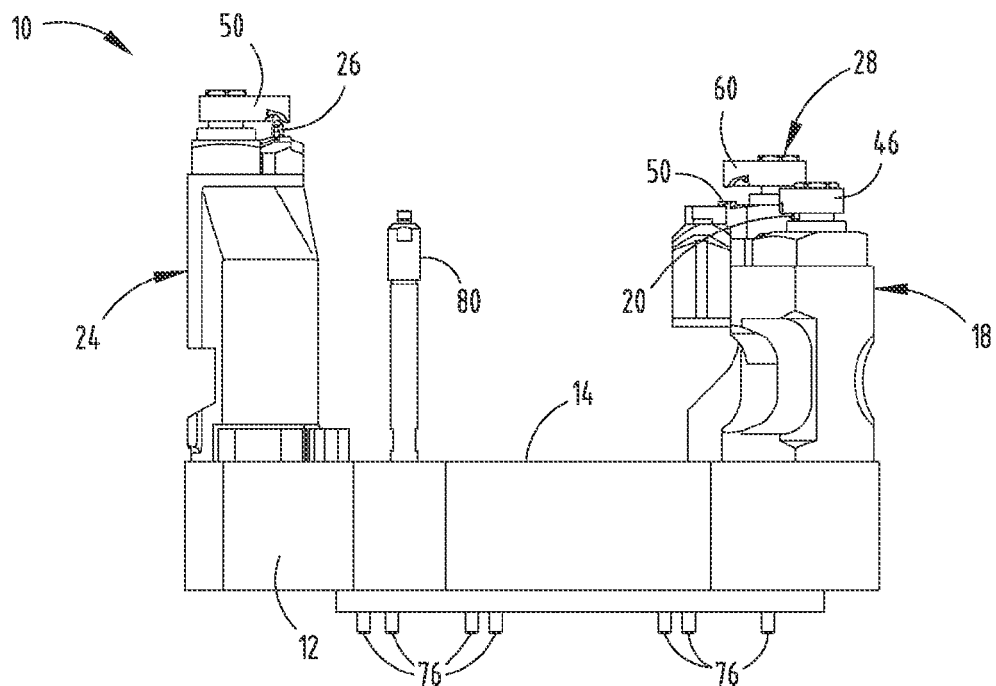
FIG. 4 is a second side elevational view of the fixture of FIG. 2.
Figure 4A:
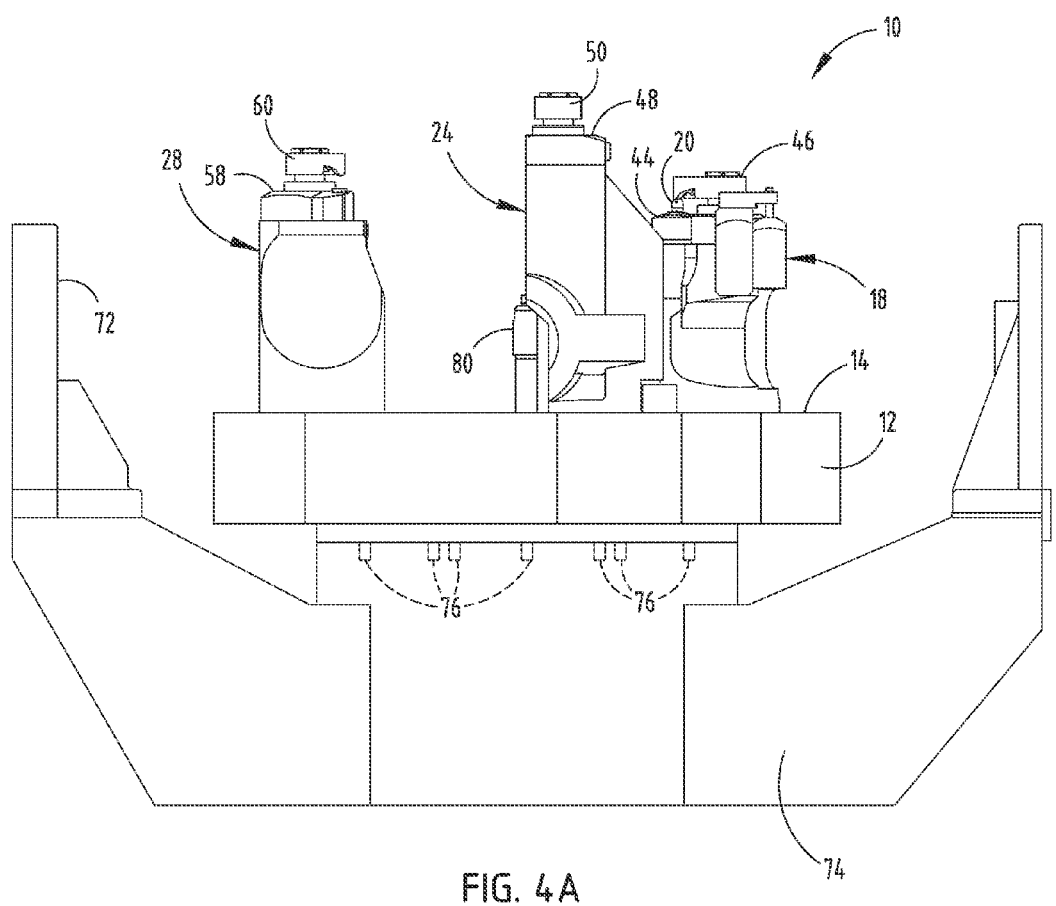
FIG. 4A is a side elevational view of the fixture of FIG. 9.
Figure 5:
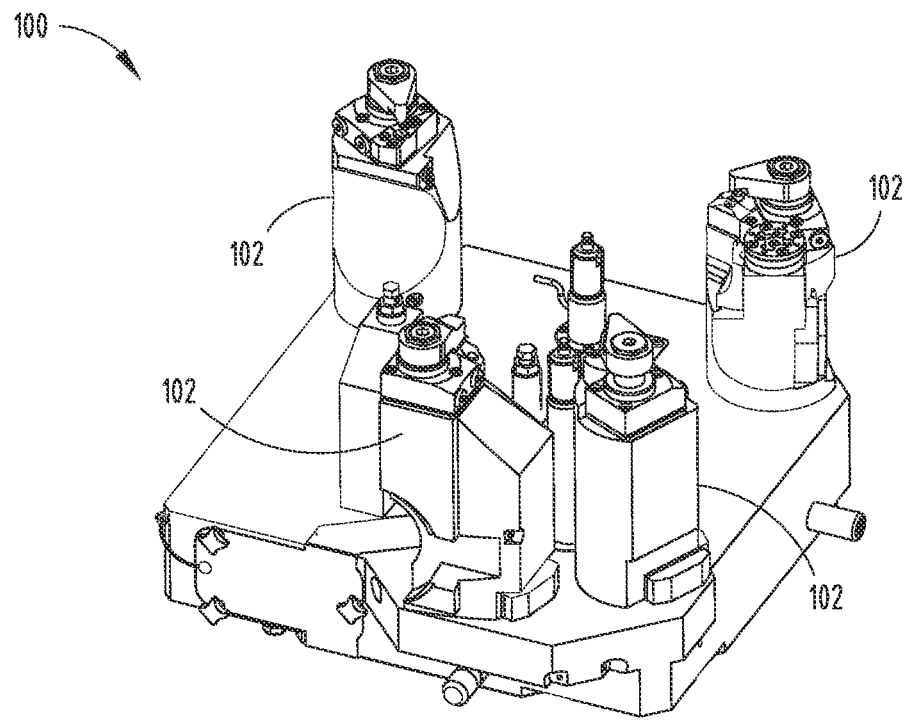
FIG. 5 is a top perspective plan view of another embodiment of a workpiece holding fixture.
Figure 6:
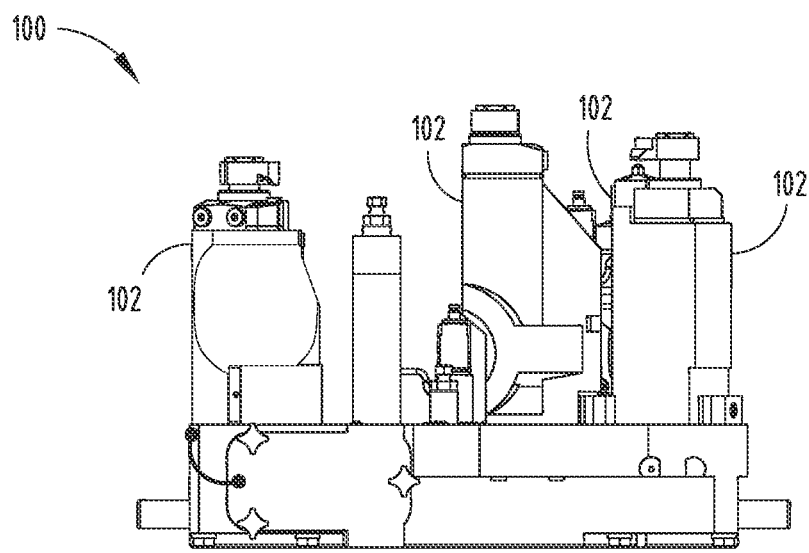
FIG. 6 is a first side elevational view of the workpiece holding fixture of FIG. 5.
Figure 7:
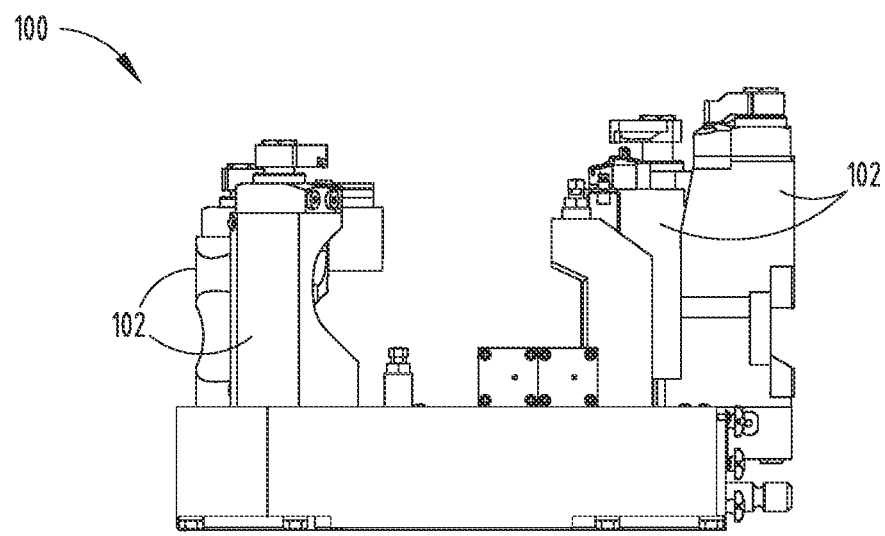
FIG. 7 is a second side elevational view of the workpiece holding fixture of FIG. 6.
Figure 8:
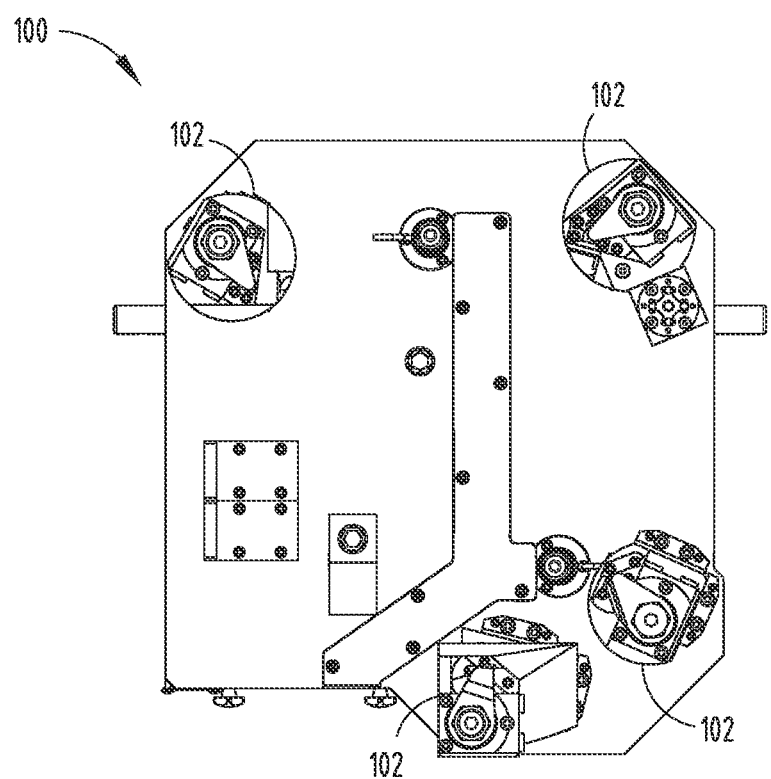
FIG. 8 is a top plan view of the workpiece holding fixture of FIG. 6.
Figure 9:
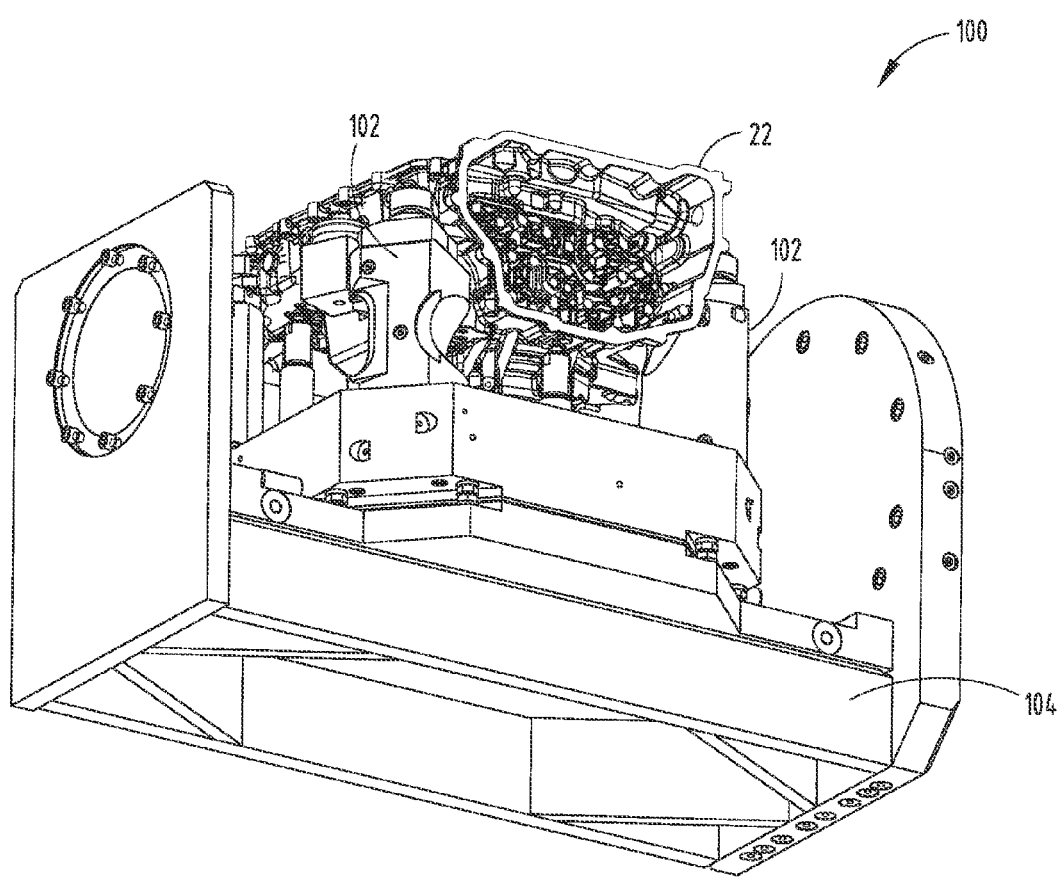
FIG. 9 is a bottom perspective view of a workpiece holding fixture that is securely engaged with a workpiece to be processed.
Figure 10:
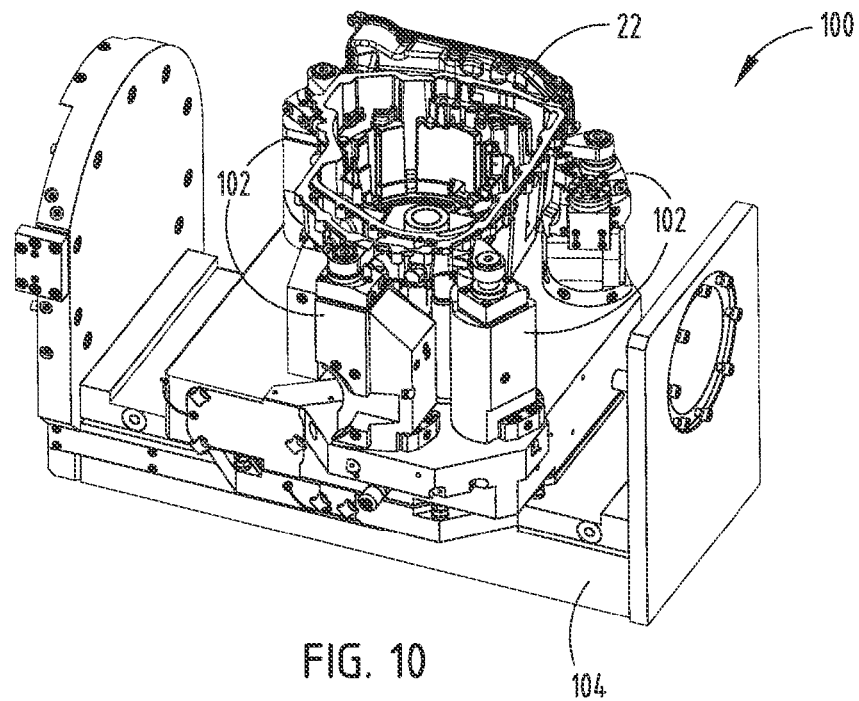
FIG. 10 is a first top side perspective view of the workpiece holding fixture of FIG. 9.
Figure 11:
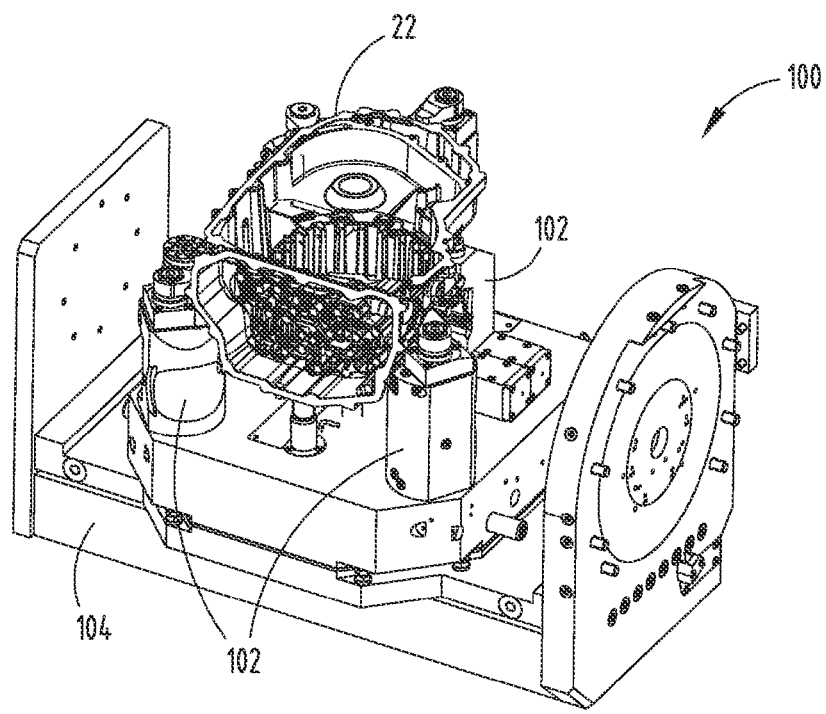
FIG. 11 is a second top side perspective view of the workpiece holding fixture of FIG. 9.

Alternatively, in another embodiment, it is contemplated that the transition device, which moves the dynamic riser 28, is disposed in a wall 72 (FIG. 4A) of a trunnion 74 (FIG. 4A), which securely engages with the base plate 12 via locating devices 76 positioned below the base plate 12. In either instance, power may be supplied to the transition device through the trunnion 74. As noted herein, it is generally contemplated that various components of different transition devices could be used in combination (i.e., a combination of the transition device 70E and the mechanical screw 70B of FIG. 1B). It is contemplated that the actuation method used in a variety of these systems could be pneumatic or hydraulic actuators and motors or electric motors.

To ensure that the workpiece 22 has properly seated against the support pads 44, 48, 58 of the first static riser 18, second static riser 24, and dynamic riser 28, respectively, an air part seating system may be utilized. The air part seating system (APS) incorporates a steady stream of air, or a blast of air, to verify that the workpiece 22 is in proper engagement with the support pads 44, 48, 58 of the first static riser 18, second static riser 24, and dynamic riser 28, respectively. An air leak indicates that the workpiece 22 is not properly seated, while no air leak is indicative of proper placement of the workpiece 22 on the support pads 44, 48, 58. If an air leak is found, the securing clamps 46, 50, 60 can be lifted from engagement with the first, second, and third tabs, and the workpiece 22 can be reseated. This process can be repeated if the workpiece 22 fails to seat properly for a second time.

The workpiece holding fixture 10 is generally set up to receive, locate, and clamp workpieces of a variety of shapes and sizes. Examples of workpieces 22 include transmission cases, transmission converter housings, hydraulic control bodies, transmission case extensions, power take off units, rear drive units, transfer cases, planetary carriers, cylinder blocks, cylinder heads, bearing girdles, front covers, intake manifolds, exhaust manifolds, carriers, and cases. The first and second static risers 18, 24 generally maintain a position relative to the base plate 12 during use while the third riser, the dynamic riser 28, moves along one plane. This invention accommodates models with defined points or defined locating point windows. The workpiece holding fixture 10 is generally rapidly convertible. Moreover, one workpiece holding fixture 10 can be used to hold a variety of workpieces 22. More specifically, the workpiece 22 engaged by the workpiece holding fixture 10 can be automatically rearranged, in some instances, in a very short period of time—typically less than 28 seconds, thereby dramatically reducing or potentially eliminating the downtime associated with model changeovers. The first and second static risers 18, 24, as well as the dynamic riser 28 and the securing clamps 46, 50, 60, are all highly accurate and precisely move to constrain workpieces 22 statically in the workpiece holding fixture 10 against all processing forces. The securing clamps 46, 50, 60 generally move between a lowered engaged position in contact with the workpiece 22 and a raised disengaged position out of contact with the workpiece 22. In the illustrated embodiment, the securing clamps 46, 50, 60 are generally configured to rotate approximately 90 degrees. However, it is contemplated that the clamps 46, 50, 60 could rotate any predetermined amount that allows for engagement with the workpiece 22 and clear disengagement from the workpiece 22. It is contemplated that the workpiece 22 can be moved to accommodate processing on every side of the workpiece 22. The workpiece holding fixture 10 is configured to eliminate the possibility of distortion or damage to the workpiece 22. Additionally, APS and clamp force monitoring is utilized to determine proper location of the workpiece 22 and the level of constraint of the workpiece 22.

In another embodiment, one or more of the first and second static risers 18, 24 are configured to also be dynamic (along with the dynamic riser 28). In this instance, many of the features outlined above are used to move one or both of the first and second static risers 18, 24 into secure engagement with the workpiece 22 on the base plate 12. The first and second static risers 18, 24 would include the transition device, as generally illustrated in FIGS. 1B-1D. In addition, work support members 80 can be used to provide additional support to the workpiece 22 during processing.

Referring now to FIGS. 5-11, in another embodiment, a four-riser workpiece holding fixture 100 is illustrated. In this embodiment, one or more of risers 102 are dynamic, while the remaining risers maintain a dynamic configuration. More specifically, one or more risers 102 maintain a fixed position relative to a base plate 104, while the remaining risers move relative to the base plate 104 as various workpieces 22 are moved into and out of engagement with the four-riser workpiece holding fixture 100, which can be secured to a trunnion. The dynamic risers could incorporate any of the systems noted above. As generally outlined above, it is contemplated that based on an automated process, or instructions provided by the user, the workpiece holding fixture 10 will reset to secure any given workpiece 22.

The incorporation of computer numerically controlled (CNC) machines has provided great flexibility in the operations and tool paths that can be utilized on various workpieces. However, the traditional work holding fixtures are characteristically designed for and dedicated to one part type and require changeover to accommodate a different part. In order for a machine tool to accommodate multiple part types with different locating or clamp points, current art generally requires that the entire machine tool fixture either be physically exchanged in the machine or the part locating details of the fixture be manually rearranged. While the process of exchanging or rearranging is completed the machine tool must be taken out of service resulting in significant productivity losses. These offline periods can take more than an hour and sometimes up to eight hours to complete.

As noted herein, the present invention provides at least one moving clamp/locating pad/riser assembly actuated via hydraulic cylinder, pneumatic cylinder, or electro-mechanical servomotor to variable positions along a path defined by slot or linear guideway on, in, or mounted to the fixture base plate. The movable riser/clamp/pad assembly allows rapid in place reconfiguration of the fixture eliminating the down time due to fixture exchanges or rearrangement currently required to complete model changes.

It will be also understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A workpiece holding fixture comprising:
   a base plate having a travel slot, the travel slot defined by first and second rails;
   a first static riser including a position control member configured to removably couple a workpiece to the first static riser;
   a second static riser including a rotation control member and configured to removably couple the workpiece to the second static riser; and
   a dynamic riser configured to abut the workpiece, the dynamic riser being slidably coupled to the first and second rails and operable between a plurality of positions associated with workpiece variants having different locating features and geometries.

2. The workpiece holding fixture of claim 1, wherein the dynamic riser is movably coupled to an elevatable stanchion.

3. The workpiece holding fixture of claim 1, wherein the dynamic riser is movably coupled with a linear motor.

4. The workpiece holding fixture of claim 1, wherein the dynamic riser is movably coupled with a hydraulic cylinder.

5. The workpiece holding fixture of claim 1, wherein the dynamic riser is movably coupled with an electromechanical system.

6. The workpiece holding fixture of claim 1, wherein the dynamic riser is movable along a linear path.

7. The workpiece holding fixture of claim 1, wherein the dynamic riser is movable along an arcuate path.

8. The workpiece holding fixture of claim 1, wherein each of the first and second static risers and the dynamic riser include a vertically extendable and rotatable securing clamp.

9. A workpiece holding fixture comprising:
   a base plate;
   first and second static risers engaged with an engagement surface of the base plate having engagement pins to securely engage a workpiece at predetermined locating positions;
   a dynamic riser configured to movably engage the workpiece in a first direction; and
   a transition device configured to electronically move the dynamic riser in a second direction along the engagement surface of the base plate.

10. The workpiece holding fixture of claim 9, wherein the dynamic riser is movably coupled to an elevatable stanchion.

11. The workpiece holding fixture of claim 9, wherein the dynamic riser is movably coupled with a linear motor.

12. The workpiece holding fixture of claim 9, wherein the dynamic riser is movably coupled with a hydraulic cylinder.

13. The workpiece holding fixture of claim 9, wherein the dynamic riser is movably coupled with a pneumatic cylinder to move the dynamic riser along the engagement surface of the base plate.

14. The workpiece holding fixture of claim 9, wherein the dynamic riser is movably coupled with a rotating arm.

15. The workpiece holding fixture of claim 9, wherein each of the first and second static risers and the dynamic riser include a vertically extendable and rotatable securing clamp.

16. The workpiece holding fixture of claim 15, wherein each securing clamp is operable between an engaged position and a disengaged position.

17. The workpiece holding fixture of claim 9, wherein a first powered system moves the dynamic riser in a first direction to engage a workpiece and a second powered system powers the transition device that moves the dynamic riser in a second direction that is substantially perpendicular to the first direction.

18. A method of holding a workpiece for processing comprising:
   providing a base plate;
   securely engaging first and second static risers to the base plate;
   adjusting a dynamic riser into secure engagement with an unprocessed initial workpiece;
   engaging the first and second static risers with the unprocessed initial workpiece at predetermined locating positions;
   verifying proper engagement of the workpiece; and
   processing the unprocessed initial workpiece.

19. The method of claim 18, further comprising:
   translating the dynamic riser over the base plate using one of a hydraulic cylinder and a pneumatic cylinder.

20. The method of claim 19, further comprising:
   disengaging the first and second static risers with the workpiece and the dynamic riser with the workpiece by rotating securing clamps out of engagement with tabs on the workpiece;
   engaging the first and second static risers with an unprocessed second workpiece at predetermined locating positions; and
   adjusting a dynamic riser into secure engagement with the unprocessed second workpiece.

* * * * *